United States Patent [19]
Lilienfeld et al.

[11] 3,711,707
[45] Jan. 16, 1973

[54] AEROSOL PARTICLE MONITOR

[75] Inventors: Pedro Lilienfeld, Lexington; Arnold W. Doyle, Weston, both of Mass.

[73] Assignee: GCA Corporation, Bedford, Mass.

[22] Filed: Nov. 13, 1970

[21] Appl. No.: 89,237

[52] U.S. Cl. .........250/43.5 D, 250/44, 250/83.6 FT, 73/28
[51] Int. Cl. .............................................G01n 21/26
[58] Field of Search....250/44, 43.5 D, 43.5 MR, 83.6 FT, 250/218; 356/37, 38; 73/28

[56] References Cited

UNITED STATES PATENTS

| 3,558,884 | 1/1971 | Babich et al. | 250/43.5 D |
| 3,475,951 | 11/1969 | Goetz | 73/28 |
| 3,458,974 | 8/1969 | Orr, Jr. et al. | 73/28 X |
| 3,462,608 | 8/1969 | Weston et al. | 250/218 |

Primary Examiner—Archie R. Borchelt
Attorney—Kenway, Jenney & Hildreth

[57] ABSTRACT

In the monitoring apparatus disclosed herein, a relatively continuous monitoring of aerosol particle concentration is facilitated by concentrating the aerosol particles by impaction and then, in a structure integrated with the impaction apparatus itself, measuring the mass of the collected aerosol particles by beta radiation absorption.

4 Claims, 2 Drawing Figures

PATENTED JAN 16 1973

3,711,707

Pedro Lilienfeld and
Arnold W. Doyle,
INVENTORS

BY
Kenway, Jenney + Hildreth
ATTORNEYS

AEROSOL PARTICLE MONITOR

BACKGROUND OF THE INVENTION

This invention relates to the measurement of the concentration of aerosol particles and more particularly to such apparatus which permits relatively rapid measurement.

Conventional dust or particle monitoring instruments capable of measuring rather small concentrations have typically relied upon weighing the particles after collecting the particles over a substantial period of time, e.g., by filtering, electrostatic precipitation, or settling. While other methods which have relatively rapid responses have been devised, such as dual nozzle pressure differential systems and long-column beta absorption systems, these latter systems are typically operable only where relatively heavy concentrations of particles are encountered.

In various studies relating to atmospheric pollution, it is highly desirable to have so-called "real time" information regarding the concentration of aerosol particles. For example, numerous studies have been instituted to establish the relationship between horizontal visibility and particulate mass concentration. However, while visibility can be measured nearly instantaneously, the typical particle concentration measurements have required sampling over periods ranging from several hours to an entire day. Accordingly, it has been extremely difficult to obtain meaningful correlations when the particle concentration is changing at all rapidly.

Among the several objects of the present invention may be noted the provision of an aerosol particle monitor having a relatively rapid response; the provision of such a monitor which is highly sensitive to relatively small concentrations of particles; the provision of such a monitor which can rapidly handle relatively large volumes of gases; the provision of such a monitor which is highly accurate; and the provision of such a monitor which is reliable and which is of relatively simple and inexpensive construction. Other objects and features will be in part apparent and in part pointed out hereinafter.

SUMMARY OF THE INVENTION

Briefly, the apparatus of the present invention operates to measure the concentration of particles suspended in a fluid by removing particles from a moving stream of the fluid by impaction, the stream passing through a convergent nozzle terminating in a relatively small opening thereby to provide a relatively high fluid exist velocity. A particle receiving medium is supported in alignment with the exiting fluid jet to receive, by impaction, particles borne by the fluid stream. A beta radiation source mounted on one side of the medium and the nozzle in alignment with the jet opening provides radiation directed toward a radiation detector mounted on the opposite side of the nozzle in alignment with the source and the jet opening. The detector receives radiation transmitted from the source through the medium and any material impacted thereon. Accordingly, the rate of change of the level of radiation measured by the detector varies as a function of the concentration of particles suspended in the fluid.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
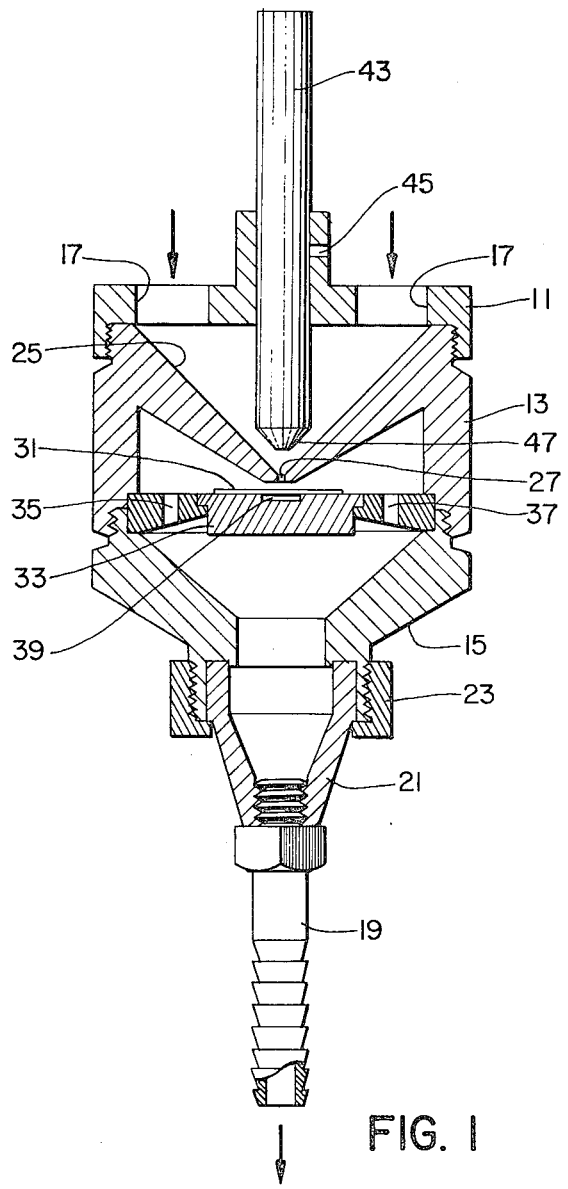
FIG. 1 is a side view, in section, of an aerosol particle monitor constructed in accordance with the present invention.

Referring now to FIG. 1, the body of the aerosol particle monitor illustrated there is made up of a number of members 11, 12 and 13 which are of generally circular cross-section and which are assembled by being threaded, each onto the next, as may be seen. The embodiment illustrated is adapted for measuring the concentration of particles present in an ambient atmosphere and, for this purpose, the upper body member 11 is provided with a plurality of openings 17 through which air may be taken in from the surrounding atmosphere. A vacuum for drawing air into and through the device is applied by means of a conventional tubing coupling 19. Coupling 19 is threaded into a cone-shaped adaptor 21 which is in turn clamped to the lower body member 15 by means of an annular ring 23 which engages a shoulder on the adaptor 21.

The middle body member 13 includes a generally conical surface 25 which defines a convergent nozzle for the air being drawn into the device. The nozzle terminates in a relatively small jet opening 27 so as to provide, for a given air flow, a relatively high fluid exit velocity from the nozzle.

A thin piece of plastic film 31, e.g., mylar, is supported just below the nozzle opening 27 to act as an impaction medium. The film 31 may, for example, be adhesively mounted on a holder 33 which is in turn held in place on a ring-like support member 35. Support member 35 is held within the body assembly by being clamped between opposing shoulders on the members 13 and 15. The support member 35 includes a plurality of openings 37 around its periphery for permitting the air flow to continue downstream after impinging upon the mylar film 31.

Recessed into the surface of the holder 33, beneath the mylar film 31, is a beta radiation source 39. For reasons described in greater detail hereinafter, a particularly suitable source is the carbon isotope C14, about one milli-curie of radiation being provided. As may be seen, the source 39 is mounted in alignment with the nozzle opening 27 for providing radiation directed back toward the jet opening. A Geiger tube 43 of the type having a relatively thin end window is provided on the upstream side of the nozzle opening 27, in alignment with the opening and the radiation source. Geiger tube 43 may, for example, be held within the upper body member 11 by means of a clamp screw 45, as shown.

The use of beta radiation is preferred since the absorption thereof is dependent essentially only on the mass of the material collected and is relatively independent of its composition for most common atmospheric aerosol particles. Similarly, carbon 14 is a preferred source in that its half-life is sufficiently long so that the source intensity may be considered to be constant over the typical periods of measurement which are appropriate with the use of the present apparatus. Other isotopes can, however, be used, depending on specific design requirements.

In operation, air is drawn through the monitor at a rate which will produce effective deposition of the particles to be measured, by impaction, on the plastic film 31. As is understood by those skilled in the art, the particular rate of flow will depend upon the size of nozzle and the particular design. As particles are collected upon the plastic film 31, their presence contributes to the attenuation of the beta radiation received and measured by Geiger tube 43. As is also understood by those skilled in the art, the amount of material collected on the film, at least for small deposits, will be essentially proportional to the concentration of particles in the air stream and to the total volume of air drawn through the impaction nozzle. Further, since the percent transmission of the source radiation to the Geiger tube 43 decreases essentially as a logarithmic function of the attenuating mass interposed between the source and the Geiger tube, it can be seen that the rate of change of the level of radiation measured by the Geiger tube is a predeterminable function of the concentration of particles suspended in the indrawn air. Thus, this apparatus provides a means for measuring such particle concentrations.

The principal advantage of the present apparatus is that the aerosol particles are concentrated for measurement and the measurement is performed on a "real time" basis, that is, simultaneously with the collecting and concentrating process. In contrast, typical filter-type measurement procedures require that the particulate material accumulate for a substantial period of time and over a relatively large area, thus complicating the final measurement procedure. Further, the final measurement is typically performed separately from the filtering. In the present apparatus, the beta radiation source and the sensitive area of the radiation detector may be relatively small, that is, they may correspond in size to the area over which material is collected by impaction. As will be understood, the collection area corresponds roughly to the relatively small cross-sectional area of the jet nozzle 27. Thus, a relatively accurate measurement can be made upon a relatively small total mass of collected particulate material. Likewise, the arrangement of the present invention allows monitoring to be done on a so-called "real time" basis since the radiation source and the detector are integrated in the impactor design, the detector receiving radiation through the impaction nozzle opening itself.

Figure 2:
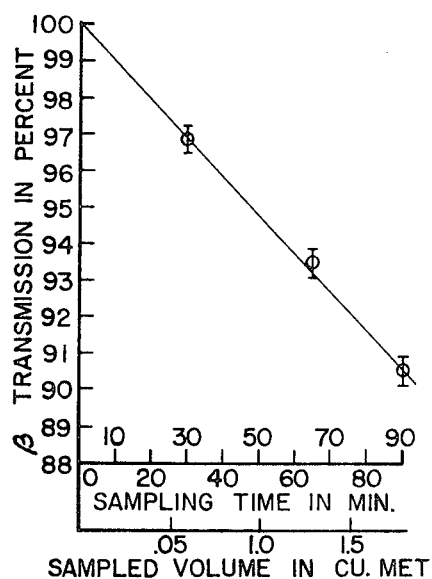
FIG. 2 is a graph representing the operation of the FIG. 1 apparatus as a function of time as the apparatus extracts particles borne by a fluid stream.

FIG. 2 represents the performance of a monitor constructed as shown in FIG. 1 when operating in a typical room atmosphere. The test atmosphere may be taken to be reasonably representative of an urban atmosphere with regard to concentration of aerosol particles. In this test, air was drawn through the apparatus at about 20 liters per minute. The nozzle opening 27 had an area of 0.0154 square centimeters and the spacing between the nozzle and the impaction surface was 0.059 centimeters. The impaction media 31 was a disc of ¼ mil mylar. A 1 milli-curie source of carbon 14 was used as the radiation source 39. FIG. 2 represents the transmission of beta radiation in percent plotted as a function of sampling time in minutes or, on the second scale, the sampled volume in cubic meters.

As may be seen, the transmission falls off as particulate matter is collected on the impaction media 31. As will be understood by those skilled in the art, the slope of this plot is representative of the concentration of aerosol particles in the air being drawn in the monitor. The vertical line extending through each of the plotted points represents the calculated possible error range due to the statistical variation inherent in radiation counting procedures. However, it will be seen that a relatively accurate measurement may be obtained in the period of an hour or less. It can thus be seen that the apparatus illustrated provides the desired function of obtaining essentially "real time" measurement of aerosol suspension concentrations at normal atmospheric type concentrations and thus provides a valuable tool for pollution studies and control.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. Apparatus for measuring the concentration of particles suspended in a fluid, said apparatus comprising:
    means defining a convergent nozzle for said fluid;
    means for inducing a stream of said fluid to flow through said nozzle, said nozzle terminating in a relatively small jet opening thereby providing a relatively high fluid exit velocity;
    means for supporting a particle receiving medium in alignment with the exiting fluid jet to receive by impaction particles borne by said fluid stream;
    a radiation source mounted on one side of said medium and said nozzle in alignment with said opening for providing beta radiation directed through said medium; and
    a radiation detector mounted on the opposite side of said nozzle having a sensitive area in alignment with said source and said jet opening for receiving radiation transmitted from said source through said medium and material impacted thereon, whereby the rate of change of the level of radiation measured by said detector varies as a function of the concentration of particles suspended in said fluid stream.

2. Apparatus for measuring the concentration of aerosol particles suspended in a gas, said apparatus comprising:
    means defining a convergent nozzle for said gas;
    means for inducing a stream of said gas to flow through said nozzle, said nozzle terminating in a relatively small jet opening thereby providing a relatively high exit velocity;
    means in alignment with the exiting fluid jet to receive by impaction particles borne by said gas stream;

a beta radiation source mounted on one side of said receiving means and said nozzle and in alignment with said jet opening for providing beta radiation directed toward said jet opening; and a beta radiation detector mounted on the opposite side of said nozzle and having a sensitive area corresponding in size to said jet opening, said sensitive area being in alignment with said source and said jet opening for receiving radiation transmitted back from said source, whereby the rate of change of the level of radiation measured by said detector varies as a function of the concentration of particles suspended in said fluid stream.

3. Apparatus for measuring the concentration of dust particles suspended in air, said apparatus comprising:

means defining a convergent nozzle;

means for drawing a stream of said air through said nozzle, said nozzle terminating in a relatively small jet opening thereby providing a relatively high exit velocity;

a particle receiving medium in alignment with the exiting jet to receive by impaction particles borne by said air stream;

a carbon 14 beta radiation source mounted on the downstream side of said medium in alignment with said jet opening for providing beta radiation directed through said medium toward said jet opening; and a Geiger tube detector mounted on the upstream side of said nozzle and having a sensitive area corresponding to said jet opening, said sensitive area being in alignment with said source and said jet opening for receiving beta radiation transmitted back from said source through said medium and particulate material impacted thereon, whereby the rate of change of the level of beta radiation measured by said detector varies as a function of the concentration of particles suspended in said air.

4. Apparatus for measuring the concentration of aerosol particles suspended in air, said apparatus comprising:

a first body member having an air inlet therein;

a second body member having a portion defining a convergent nozzle;

a third body member including means for applying a vacuum for drawing a stream of said air through said nozzle, said nozzle terminating in a relatively small jet opening thereby providing a relatively high exit velocity;

a plastic film particle receiving medium supported in alignment with the exiting air jet to receive, by impaction, particles borne by said air stream;

a carbon 14 beta radiation source mounted on the downstream side of said medium in alignment with said jet opening for providing beta radiation directed through said medium toward said jet opening; and a Geiger tube detector mounted on said first body member on the upstream side of said nozzle and having a sensitive area corresponding in size to said jet opening, said sensitive area being in alignment with said source and said jet opening for receiving beta radiation transmitted back from said source through said medium and particulate material impacted thereon, whereby the rate of change of the level of beta radiation measured by said detector varies as a function of the concentration of particles suspended in said air.

* * * * *